UNITED STATES PATENT OFFICE.

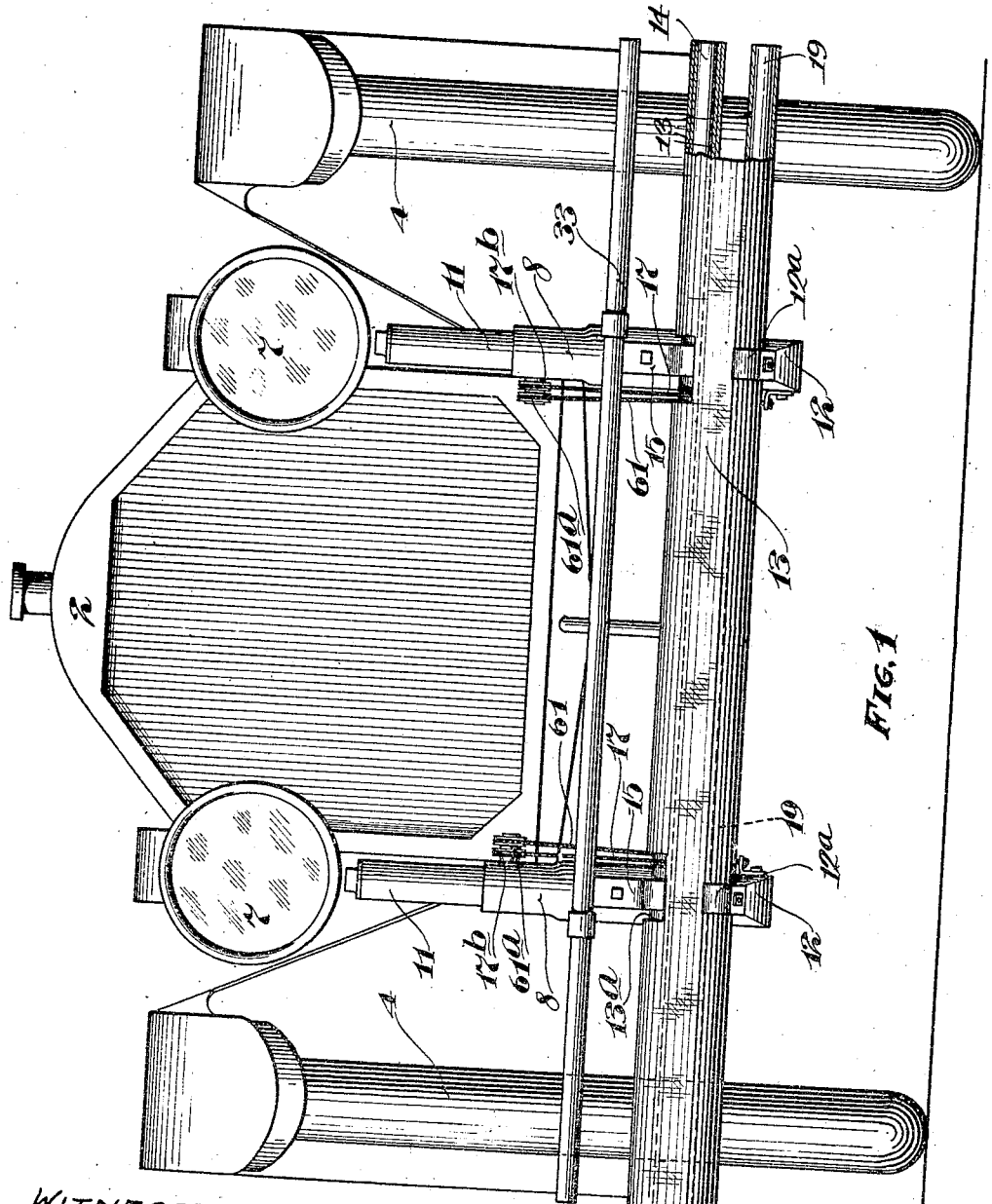

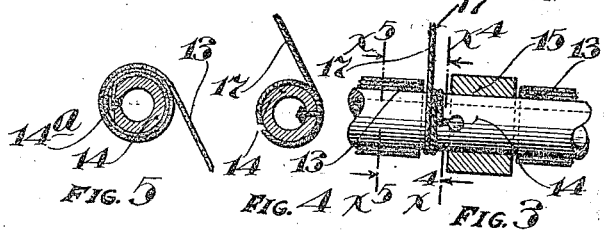
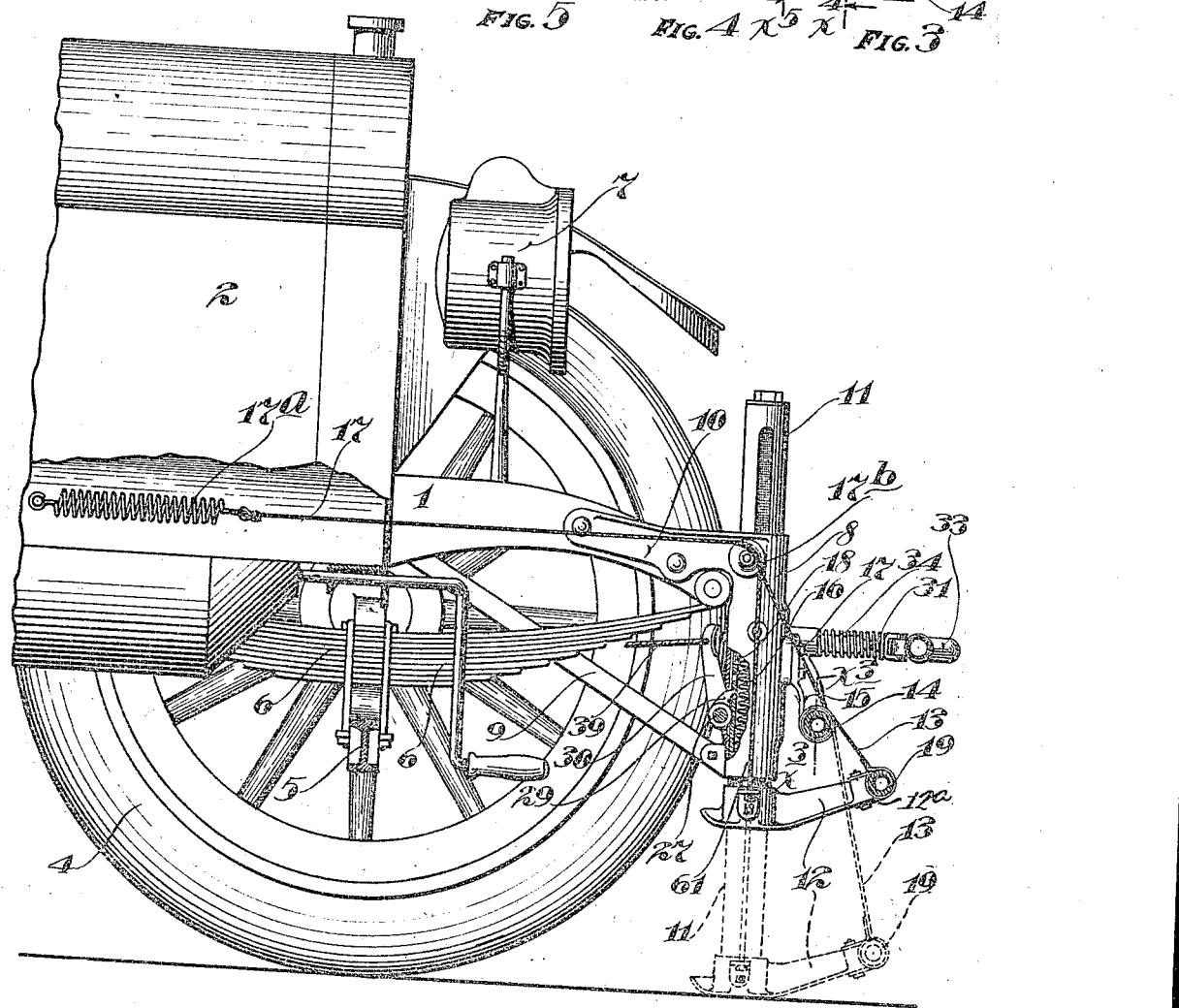

WILLIAM A. LINQUIST, OF MINNEAPOLIS, MINNESOTA.

AUTOMOBILE-FENDER.

1,085,988. Specification of Letters Patent. Patented Feb. 3, 1914.

Application filed September 5, 1912. Serial No. 718,647.

*To all whom it may concern:*

Be it known that I, WILLIAM A. LINQUIST, a citizen of the United States, residing at Minneapolis, in the county of Hennepin and State of Minnesota, have invented certain new and useful Improvements in Automobile-Fenders; and I do hereby declare the following to be a full, clear, and exact description of the invention, such as will enable others skilled in the art to which it appertains to make and use the same.

My present invention has for its particular object the provision of an extremely simple and highly efficient fender for automobiles and similar vehicles, and is in the nature of an improvement on, or modification of, the fender disclosed and claimed in my prior Patent, 1,033,425, of date July 23rd., 1912, and in my companion application, filed Sept. 5, 1912, under Serial No. 718,646 and entitled "Automobile fender and coöperating devices."

Generally stated, the invention consists of the novel devices and combinations of devices hereinafter described and defined in the claims.

In the accompanying drawings, which illustrate my invention, like characters indicate like parts throughout the several views.

Referring to the drawings, Figure 1 is a front elevation of the automobile and fender; Fig. 2 is a side elevation with some parts sectioned, and some parts broken away, showing the fender and the front portion of the automobile; Fig. 3 is a detail with some parts sectioned, approximately on the line $x^3$ $x^3$ of Fig. 2, but with some parts shown in full and with some parts broken away; Fig. 4 is a section on the line $x^4$ $x^4$ of Fig. 3; and Fig. 5 is a section on the line $x^5$ $x^5$ of Fig. 3.

A good many of the parts of the fender attaching means disclosed in my said companion application, are identical with those of the present application, and such corresponding parts will be herein designated by the same numerals.

The chief novel feature of the present fender is found in the employment of a flexible curtain and curtain rolling and unrolling devices, used as a fender, in lieu of the marginal frame and netting.

Referring now to the parts of the automobile, the numeral 1 indicates the frame work, the numeral 2 the engine hood, the numeral 4 the front wheels, the numeral 5 the front axle, the numeral 6 the front springs, and the numeral 7 the head lamps, which parts may be of the usual or any suitable construction. Long, vertically extended bearing sleeves 8 are rigidly secured to the projecting front ends of the side bars of the frame 1, this, as shown, being accomplished by brace rods 9, and by arms 10, which latter are formed integral with said sleeves and are riveted or bolted to said side bars. So-called plunger bars 11, which are also preferably tubular, are mounted to move vertically in the sleeves 8 and at their lower ends are provided with rigidly secured ground engaging shoes 12. The plunger bars 11 are yieldingly forced downward by gravity and by coiled springs 16, which springs are interposed in the sleeves 8 in a manner more fully disclosed in my said companion application.

The novel fender apron herein employed comprises a wide curtain 13 of heavy canvas, or any other suitable material which is capable of being rolled up and unrolled. This curtain 13 is normally wound, to almost its entire extent, on a large roller 14, journaled at its intermediate portions in bearings supported by brackets 15, rigidly secured to the bearing sleeves 8. The roller 14, at its ends, projects beyond the sides of the front wheels 4, and the curtain 13 is in width, approximately, the full length of said roller, and at its inner edge, is suitably secured thereto, at 14$^a$ (see Fig. 5). Said curtain is cut away for a portion of its length, as shown at 13$^a$, to clear the bearing brackets 15, and tension cables 17. The said cables 17, at their lower ends, are secured to the roller 14 and are wound thereon reversely to the curtain 13, and they are extended upward over guide sheaves 17$^b$ on the bearing sleeves 8 and are connected to springs 17$^a$, suitably anchored to the frame work 1. These springs 17$^a$ exert a yielding force, which operating on the roller 14, through the cables 17, tends to keep the curtain 13 rolled up. The lower edge of the curtain 13 is attached to a transverse bar or rod 19, the ends of which are rigidly secured to the upwardly and forwardly projecting ends of the shoes 12 by clips 12$^a$. It may be here stated that the plunger bars 11, shoes 12 and clips 12$^a$ constitute holders for the rod 19. These holders are held for straight line vertical sliding movement by the sleeves 8.

The plunger bars 11, in their rear walls, are provided with vertically spaced notches 18, that afford ratchet teeth which are adapted to be engaged by retaining dogs 29, secured to a rock shaft 27, mounted in suitable bearings on the sleeves 8. The rock shaft 27 is provided with upwardly extended tripping arms 30, that are adapted to be engaged by the rear ends of forwardly projecting tripping plungers 31 mounted in suitable bearings on the sleeves 8, and at their front ends connected to a transversely extended tripping bar 33. Springs 34, compressed between the heads of the tripping plungers 31 and the bearings in which they are mounted, yieldingly hold the said tripping bars and plungers in forwardly projected positions, as shown in Fig. 2, and as more fully illustrated in my companion application, filed September 5, 1912, under Serial No. 718,646, and above identified. By means of a suitable spring not shown, the retaining dogs 29 are yieldably held engaged with the ratchet teeth 18 of the plunger bars 11, so that normally the said plunger bars and the shoes 12 will be held in raised positions, and the curtain 13, which constitutes the body of the fender, will be held rolled up, by the springs 17ª, as shown by full lines in Fig. 2.

When the tripping bar 33 is engaged and pressed rearward, the plungers 31 act on the arms 30, and serve to release the dogs 29 from the teeth 18 of the plunger bars 11. When the said plunger bars 11 are thus released, the action of the springs 16 on said plunger will force the same downward until the shoes 12 strike the ground. This action unrolls the fender curtain and positions the same as indicated by the dotted lines in Fig. 2. The curtain is then held in such position that it will catch a person who may have fallen or been knocked down in front of the machine. Furthermore, this curtain or flexible fender, will yield when a person is thrown against the same, and the springs 17ª will allow the curtain to unroll farther, so as to permit the curtain to form a sort of a pocket in which to catch and hold a person thus caught. Hence, this curtain, operating as a fender, not only prevents a person from being thrown under the machine, but by its yielding and cushion action, will catch the person in such a way as to do the least possible injury.

Inasmuch as the tripping bar 33 is normally in front of the fender, it can almost always be relied upon to be engaged by a person in front of the machine, who is about to be run over, and thereby to automatically trip the fender in time to catch such person who is in danger of being run over. However, suitable means, such as that more fully disclosed in my said companion application, is preferably provided for manually tripping the fender at will, and as shown, such means comprises a cable 39, attached to one of the tripping levers 30, and extended rearward to a suitable foot-piece or lever, not shown. Also, I preferably provide means whereby the fender may be restored to normal position without requiring the operator to leave the machine. Such means is preferably that more fully disclosed in my said companion application, and as shown, the said means includes the cable 61, attached to the shoes 12, and passed over suitable guide sheaves 61ª, on the sleeves 8.

What I claim is:—

1. A combination with a vehicle, of a roller supported in front thereof, a bar, holders for said bar, fixed guides on said vehicle in which said holders are slidably mounted for straight line vertical movement, and a curtain wound on said roller and attached to said bar.

2. A combination with a vehicle, of a fender comprising bearings supported in front of the frame of said machine, plunger bars movable vertically in said bearings, and provided with shoes at their lower ends, a roller supported by said bearings, a curtain rod attached to said shoes, a fender curtain wound on said roller and attached to said rod, and yielding means tending to rotate said roller in a direction to wind up said curtain.

3. A combination with a vehicle, of a fender attachment therefor supported in front thereof and comprising a curtain roller, a curtain rod, means including holders slidably mounted in guides for moving one of said curtain holding parts vertically with respect to the other, a fender curtain wound on said roller and attached to said rod and yielding means, tending to wind said curtain on said roller.

4. A combination with a vehicle, of a fender attachment therefor, supported in front thereof and comprising a curtain roller, a curtain rod, means including holders slidably mounted in guides for moving one of said parts vertically with respect to the other, a fender curtain wound on said roller and attached to said rod, and yielding means tending to wind said curtain on said roller, means for securing said holders with the said curtain wound upon said roller, and a trip for releasing said holders to permit said curtain to be unwound and extended into an operative position.

5. A combination with a vehicle, of a fender comprising bearings supported in front of the frame of said machine, plunger bars movable vertically in said bearings, and provided with shoes at their lower ends, a roller supported by said bearings, a curtain rod attached to said shoes, a fender curtain wound on said roller and attached to said rod, and yielding means tending to rotate said roller in a direction to wind up said curtain, springs tending to throw said plunger bars and shoes downward to thereby position said curtain for action, a retaining device operating on said plunger bars to hold the same and said shoes raised and means operative on said retaining device to release said plunger bars and shoes.

6. A combination with a vehicle, of a fender comprising bearings supported in front of the frame of said machine, plunger bars movable vertically in said bearings, and provided with shoes at their lower ends, a roller supported by said bearings, a curtain rod attached to said shoes, a fender curtain wound on said roller and attached to said rod, and yielding means tending to rotate said roller in a direction to wind up said curtain, springs tending to throw said plunger bars and shoes downward to thereby position said curtain for action, a device operating on said plunger bars to hold the same and said shoes raised and means operative on said retaining device to release said plunger bars and shoes, the said means including a tripping bar, yieldingly supported in front of said fender, substantially as described.

In testimony whereof I affix my signature in presence of two witnesses.

WILLIAM A. LINQUIST.

Witnesses:
 HARRY D. KILGORE,
 F. D. MERCHANT.